United States Patent
Unno et al.

(10) Patent No.: US 10,391,879 B2
(45) Date of Patent: Aug. 27, 2019

(54) ENERGY STORAGE SYSTEM, TRANSPORTER, AND CONTROL METHOD

(71) Applicant: HONDA MOTOR CO., LTD., Tokyo (JP)

(72) Inventors: Ryota Unno, Wako (JP); Daijiro Takizawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 204 days.

(21) Appl. No.: 15/333,195

(22) Filed: Oct. 25, 2016

(65) Prior Publication Data

US 2017/0120767 A1 May 4, 2017

(30) Foreign Application Priority Data

Oct. 29, 2015 (JP) ................. 2015-213302

(51) Int. Cl.
| | | |
|---|---|---|
| *B60L 11/18* | (2006.01) | |
| *H02J 7/00* | (2006.01) | |
| *B60L 3/00* | (2019.01) | |
| *B60L 58/12* | (2019.01) | |
| *B60L 58/21* | (2019.01) | |

(Continued)

(52) U.S. Cl.
CPC ......... *B60L 11/1861* (2013.01); *B60L 3/0046* (2013.01); *B60L 58/12* (2019.02); *B60L 58/20* (2019.02); *B60L 58/21* (2019.02); *B60L 58/25* (2019.02); *H02J 7/0016* (2013.01); *H02J 7/0063* (2013.01); *B60L 2210/10* (2013.01); *B60L 2240/526* (2013.01); *B60L 2240/527* (2013.01); *B60L 2240/529* (2013.01); *B60L 2240/545* (2013.01); *B60L 2240/547* (2013.01); *B60L 2240/549* (2013.01); *H02J 7/0065* (2013.01); *H02J 2007/0067* (2013.01); *Y02T 10/7005* (2013.01); *Y02T 10/7044* (2013.01); *Y02T 10/7061* (2013.01); *Y02T 10/7066* (2013.01); *Y02T 10/7216* (2013.01)

(58) Field of Classification Search
None
See application file for complete search history.

(56) References Cited

U.S. PATENT DOCUMENTS

2012/0104861 A1* 5/2012 Kojori ................. H01M 10/46
  307/82
2014/0312828 A1* 10/2014 Vo ..................... H01M 10/4257
  320/103

FOREIGN PATENT DOCUMENTS

JP 2011-041386 2/2011

* cited by examiner

*Primary Examiner* — Thienvuu V Tran
*Assistant Examiner* — David M Stables
(74) *Attorney, Agent, or Firm* — Mori & Ward, LLP

(57) ABSTRACT

An energy storage system includes a first energy storage, a second energy storage, a transformer, and circuitry. The first energy storage outputs a first output voltage. The second energy storage outputs a second output voltage. The transformer transforms at least one of the first output voltage and the second output voltage. The circuitry is configured to detect a sign of a fault in at least one of the first energy storage and the second energy storage. The circuitry is configured to control the transformer so as to transfer power from one energy storage among the first energy storage and the second energy storage to another energy storage among the first energy storage and the second energy storage in a case where the detector detects the sign of the fault in the one energy storage.

16 Claims, 8 Drawing Sheets

(51) Int. Cl.
*B60L 58/20* (2019.01)
*B60L 58/25* (2019.01)

ENERGY STORAGE SYSTEM, TRANSPORTER, AND CONTROL METHOD

CROSS-REFERENCE TO RELATED APPLICATIONS

The present application claims priority under 35 U.S.C. § 119 to Japanese Patent Application No. 2015-213302, filed Oct. 29, 2015, entitled "Energy Storage System, Transporter, and Control Method" The contents of this application are incorporated herein by reference in their entirety.

BACKGROUND

1. Field

The present disclosure relates to an energy storage system, transporter, and control method.

2. Description of the Related Art

Japanese Unexamined Patent Application Publication No. 2011-41386 describes a vehicle provided with three energy storage units, a drive system configured so as to generate drive force using power from the three energy storage units, and three relays provided corresponding to the three respective energy storage units so as to switch between supplying and disconnecting power with respect to the three energy storage units. An ECU of the vehicle detects faults in the three energy storage units, and controls the three relays so as to change connection states between the drive system and the three energy storage units according to detected fault states in the energy storage units.

SUMMARY

According to a first aspect of the present invention, an energy storage system includes a first energy storage, a second energy storage, a transformation section, a detection section, and a controller. The transformation section transforms at least one of an output voltage of the first energy storage and an output voltage of the second energy storage. The detection section detects a prior indicator of faults in at least one of the first energy storage and the second energy storage. The controller controls the transformation section. When the detection section has detected a prior indicator of a fault in the first energy storage or the second energy storage, the controller controls the transformation section so as to transfer power from the energy storage in which the prior indicator has been detected to the other energy storage.

According to a second aspect of the present invention, a control method for an energy storage system including a first energy storage, a second energy storage, a transformation section that transforms at least one of an output voltage of the first energy storage and an output voltage of the second energy storage, a detection section that detects a prior indicator of faults in at least one of the first energy storage and the second energy storage, and a controller that controls the transformation section, the control method includes when the detection section has detected a prior indicator of a fault in the first energy storage or the second energy storage, the controller controlling the transformation section so as to transfer power from the energy storage in which the prior indicator has been detected to the other energy storage.

According to a third aspect of the present invention, an energy storage system includes a first energy storage, a second energy storage, a transformer, and circuitry. The first energy storage outputs a first output voltage. The second energy storage outputs a second output voltage. The transformer transforms at least one of the first output voltage and the second output voltage. The circuitry is configured to detect a sign of a fault in at least one of the first energy storage and the second energy storage. The circuitry is configured to control the transformer so as to transfer power from one energy storage among the first energy storage and the second energy storage to another energy storage among the first energy storage and the second energy storage in a case where the detector detects the sign of the fault in the one energy storage.

According to a fourth aspect of the present invention, a control method for an energy storage system, includes detecting a sign of a fault in at least one of a first energy storage and a second energy storage. A transformer is controlled so as to transfer power from one energy storage among the first energy storage and the second energy storage to another energy storage among the first energy storage and the second energy storage in a case where the detector detects the sign of the fault in the one energy storage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
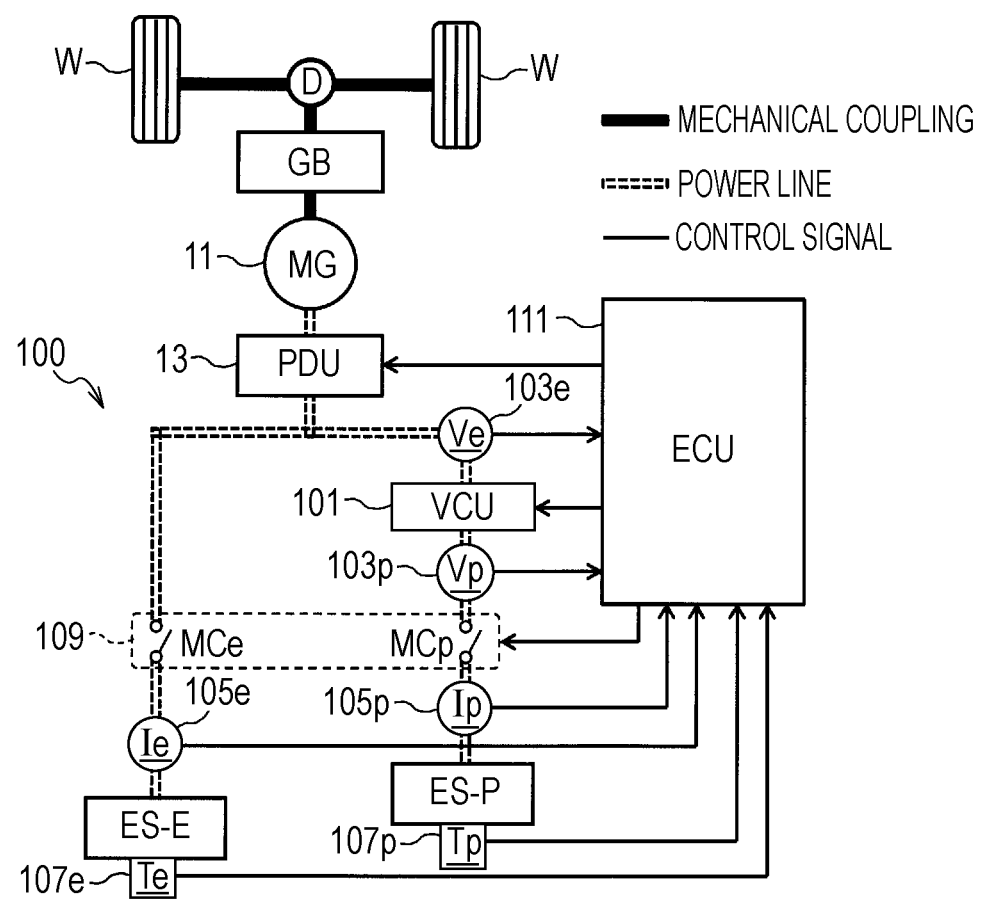
FIG. 1 is a block diagram of a schematic configuration of an electrically powered vehicle of an embodiment of the present disclosure.

The embodiments will now be described with reference to the accompanying drawings, wherein like reference numerals designate corresponding or identical elements throughout the various drawings.

Explanation follows regarding an embodiment of the present disclosure, with reference to the drawings.

FIG. 1 is a block diagram illustrating a schematic configuration of an electrically powered vehicle installed with an energy storage system of an embodiment of the present disclosure. Note that in FIG. 1, mechanical couplings are indicated by bold continuous lines, power lines are indicated by double dashed lines, and control signals are indicated by thin continuous lines. The single motor electrically powered vehicle illustrated in FIG. 1 includes a motor/generator (MG) 11, a power drive unit (PDU) 13, and an energy storage system 100 of the present embodiment. Explanation follows regarding the respective elements of the electrically powered vehicle.

The motor/generator 11 is driven by power supplied from the energy storage system 100, and generates motive power to drive the electrically powered vehicle. The torque generated by the motor/generator 11 is transmitted to drive wheels W through a gear box GB including a variable transmission or a fixed transmission, and through a differential gear D. The motor/generator 11 operates as a power generator during deceleration of the electrically powered vehicle, so as to output the braking power of the electrically powered vehicle. Regenerated power generated by the motor/generator 11 operating as a power generator is accumulated in batteries of the energy storage system 100.

The PDU 13 converts a direct current voltage into an alternating current voltage, and supplies three-phase current to the motor/generator 11. The PDU 13 converts an alternating current voltage input during a regeneration operation of the motor/generator 11 into a direct current voltage.

As illustrated in FIG. 1, the energy storage system 100 includes a high-capacity battery ES-E, a high-power battery ES-P, a voltage control unit (VCU) 101, voltage sensors $103p$ and $103e$, current sensors $105p$ and $105e$, temperature sensors $107p$ and $107e$, a switch section 109, and an electronic control unit (ECU) 111.

The high-capacity battery ES-E includes plural energy storage cells, such as lithium ion batteries or nickel hydride batteries, and supplies high voltage power to the motor/generator 11. The high-power battery ES-P also includes plural energy storage cells, such as lithium ion batteries or nickel hydride batteries, and supplies high voltage power to the motor/generator 11 through the VCU 101. The high-power battery ES-P is connected through the VCU 101 to the PDU 13, and is in parallel with the high-capacity battery ES-E. Generally, the voltage of the high-power battery ES-P is lower than the voltage of the high-capacity battery ES-E. Thus, the power of the high-power battery ES-P is stepped up by the VCU 101 to a voltage of the same level as that of the high-capacity battery ES-E, and then supplied to the motor/generator 11 through the PDU 13.

The high-capacity battery ES-E and the high-power battery ES-P are not limited to secondary batteries, such as the nickel hydride batteries or the lithium ion batteries mentioned above. For example, even though it has a small amount of stored energy, a condenser or capacitor capable of charging or discharging a large quantity of power over a short period of time may be employed as the high-power battery ES-P.

The characteristics of the high-capacity battery ES-E and the characteristics of the high-power battery ES-P are different from each other. The high-capacity battery ES-E has a lower power weight density, but a higher energy weight density, than the high-power battery ES-P. The high-power battery ES-P has a lower energy weight density, but a higher power weight density, than the high-capacity battery ES-E. Accordingly, the high-capacity battery ES-E is relatively superior from the perspective of energy weight density, and the high-power battery ES-P is relatively superior from the perspective of power weight density. The energy weight density is the quantity of power per unit weight (Wh/kg), and the power weight density is the power output per unit weight (W/kg). Accordingly, the high-capacity battery ES-E that has superior energy weight density is a power storage unit employed for its high capacity, and the high-power battery ES-P that has superior power weight density is a power storage unit employed for its high output.

Such differences between the characteristics of the high-capacity battery ES-E and the high-power battery ES-P are caused, for example, by various parameters determined by the structure, materials, etc. of elements configuring the battery, such as the electrodes, active substances, electrolytes, and solutions. For example, the energy storage capacity, this being a parameter indicating the total amount of chargeable and dischargeable electricity, of the high-capacity battery ES-E is superior to that of the high-power battery ES-P. However, a C rate characteristic, this being a parameter indicating the ability to withstand deterioration of the energy storage capacity with respect to charging and discharging, and the internal resistance (impedance), this being a parameter indicating the electrical resistance to charging and discharging, are better in the high-power battery ES-P than in the high-capacity battery ES-E.

The VCU 101 steps up the output voltage of the high-power battery ES-P without converting from direct current. The VCU 101 steps down power that has been generated by the motor/generator 11 during deceleration of the electrically powered vehicle and that has been converted into direct current. The VCU 101 also steps down the output voltage of the high-capacity battery ES-E without converting from direct current. Power that has been stepped down by the VCU 101 is used to charge the high-power battery ES-P. Note that the voltage level or the current level of the direct current power output from the VCU 101 is controlled by the ECU 111.

Figure 2:
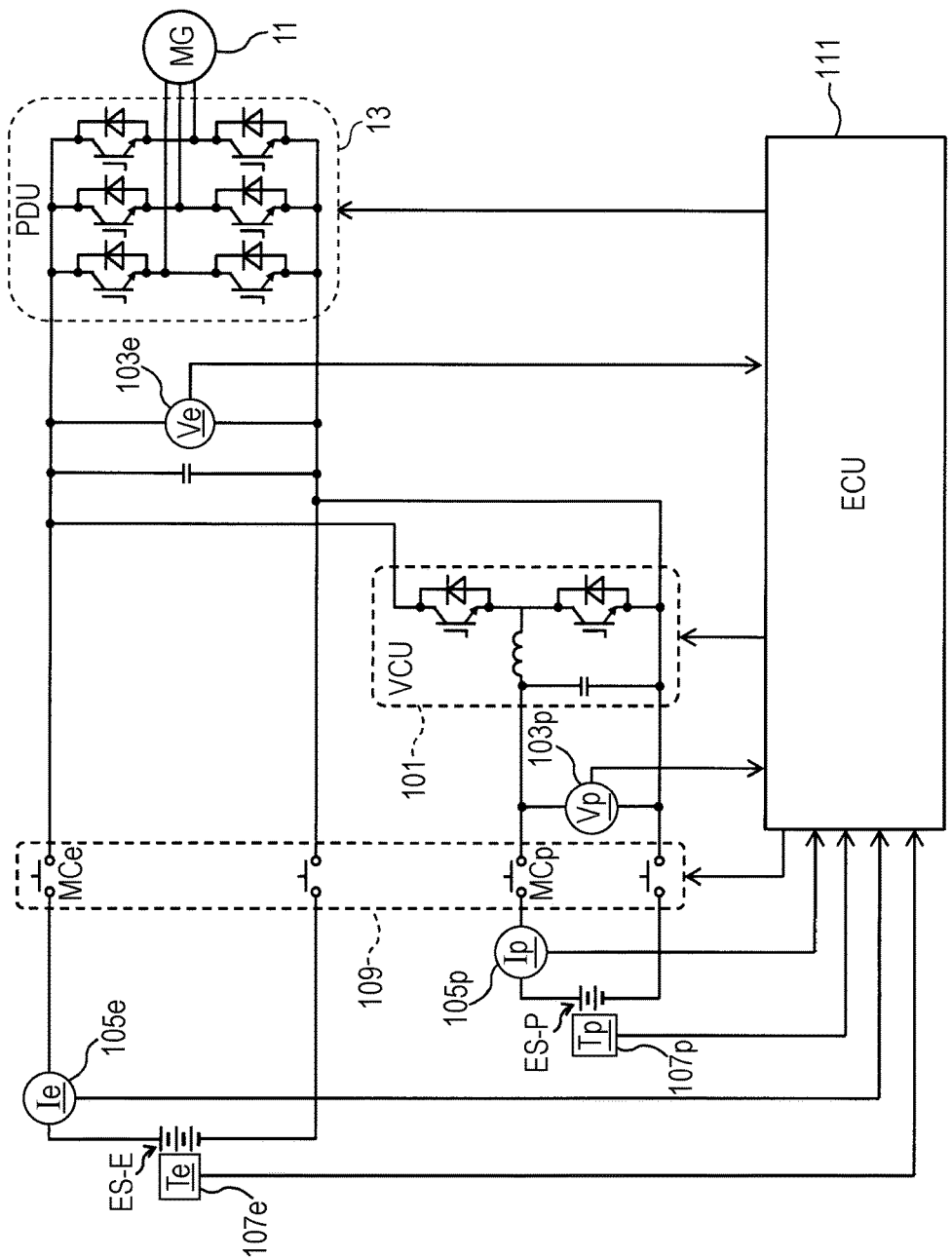
FIG. 2 is an electrical circuit diagram illustrating relationships between a high capacity battery, a high output battery, a VCU, a PDU, and a motor/generator.

FIG. 2 is an electrical circuit diagram illustrating relationships between the high-capacity battery ES-E, the high-power battery ES-P, the VCU 101, the PDU 13, and the motor/generator 11. As illustrated in FIG. 2, the VCU 101 employs an output voltage of the high-power battery ES-P as an input voltage, and steps up and outputs the voltage of the high-power battery ES-P by switching two switching elements ON and OFF. When an upper arm switching element is placed in an ON state, and a lower arm switching element is placed in an OFF state, without switching the two switching elements ON and OFF, the high-power battery ES-P is placed in a directly connected state with the high-capacity battery ES-E and the PDU 13 in the electrical system. Generally, since as described above, the voltage of the high-power battery ES-P is lower than the voltage of the high-capacity battery ES-E, both of the two switching elements of the VCU 101 are placed in an OFF state to place the high-power battery ES-P in an open circuit state. The PDU 13 employs an output voltage of the high-capacity battery ES-E as an input voltage, and converts the direct current voltage to an alternating current voltage and outputs the alternating current voltage to the motor/generator 11 by switching six switching elements ON and OFF. When all of the six switching elements are placed in an OFF state without switching the six switching elements ON and OFF, the high-capacity battery ES-E and the high-power battery ES-P are placed in an open state from the motor/generator 11 in the electrical system.

In this manner, when, for example, the electrically powered vehicle is stationary and there is no need to drive the motor/generator 11, the ECU 111 controls the PDU 13 so as to place all of the six switching elements of the PDU 13 in the OFF state, and controls the VCU 101 so as to place both of the two switching elements of the VCU 101 in the OFF state. Due to this switching operation, if a state is present in which a voltage Ve of the high-capacity battery ES-E is higher than a voltage Vp of the high-power battery ES-P, the high-capacity battery ES-E and the high-power battery ES-P neither charge nor discharge, and each adopts an open circuit state. When in this state, if the ECU 111 switches the upper arm switching element alone of the VCU 101 to the ON state, the high-capacity battery ES-E and the high-power battery ES-P are placed in a directly connected state in the electrical system.

The voltage sensor 103p detects the voltage Vp of the high-power battery ES-P. A signal indicating the voltage Vp detected by the voltage sensor 103p is sent to the ECU 111. The voltage sensor 103e detects the voltage Ve of the high-capacity battery ES-E. The voltage Ve detected by the voltage sensor 103e is equal to the value of the voltage Vp of the high-power battery ES-P after being stepped up by the VCU 101. A signal indicating the voltage Ve detected by the voltage sensor 103e is sent to the ECU 111.

The current sensor 105p detects an input/output current Ip of the high-power battery ES-P. A signal indicating the input/output current Ip detected by the current sensor 105p is sent to the ECU 111. The current sensor 105e detects an input/output current Ie of the high-capacity battery ES-E. The signal indicating the input/output current Ie detected by the current sensor 105e is sent to the ECU 111.

The temperature sensor 107p detects a temperature Tp of the high-power battery ES-P. A signal indicating the temperature Tp detected by the temperature sensor 107p is sent to the ECU 111. The temperature sensor 107e detects a temperature Te of the high-capacity battery ES-E. A signal indicating the temperature Te detected by the temperature sensor 107e is sent to the ECU 111.

The switch section 109 includes a contactor MCe that connects and disconnects a current path from the high-capacity battery ES-E to either the PDU 13 or the VCU 101, and a contactor MCp that connects and disconnects a current path from the high-power battery ES-P to the VCU 101. The respective contactors Mce, MCp are opened and closed under the control of the ECU 111.

The ECU 111 controls the PDU 13 and the VCU 101, and also controls opening and closing of the switch section 109. The ECU 111 also uses a current integration method and/or an open circuit voltage (OCV) estimation method to derive a state of charge (SOC, also referred to as "remaining charge") for both the high-capacity battery ES-E and the high-power battery ES-P, based on the respective voltages detected by the voltage sensors 103p, 103e and the respective input/output currents detected by the current sensors 105p, 105e. The ECU 111 also manages an upper limit value (referred to below as the "system permitted power") of the suppliable power to a drive section configured by the PDU 13 and the motor/generator 11. Normally, the total of the outputtable power of the high-capacity battery ES-E and the outputtable power of the high-power battery ES-P is set as the system permitted power. In order to suppress promotion of deterioration and faults due to drawing excessive power, the outputtable powers of the high-capacity battery ES-E and the high-power battery ES-P are set to values smaller than the maximum power the respective batteries are capable of outputting.

The ECU 111 employs the VCU 101 to perform power distribution control in order to exploit the respective characteristics of the high-capacity battery ES-E and the high-power battery ES-P that have different characteristics to each other. By performing this power distribution control, the high-capacity battery ES-E is employed to supply power to the motor/generator 11 at a constant level when driving the electrically powered vehicle, and the high-power battery ES-P is employed to supply power to the motor/generator 11 when a large drive power is required to drive the electrically powered vehicle.

The ECU 111 detects faults, and prior indicators (or signs) of faults, in at least one of the high-capacity battery ES-E and the high-power battery ES-P, based on the voltage detected by the voltage sensors 103e, 103p, the current detected by the current sensors 105e, 105p, and the temperature detected by the temperature sensors 107e, 107p. For example, faults in the respective batteries are detected when broken lines or the like occur and the current flowing in the respective batteries becomes extremely small. Prior indicators of faults in the respective batteries are detected when the temperature of the batteries becomes extremely high. When a prior indicator of a fault is detected in either the high-capacity battery ES-E or the high-power battery ES-P, the ECU 111 controls the VCU 101 so as to transfer power from the battery in which the prior indicator has been detected to the other battery. Note that the discharge rate of the battery during power transfer is assigned by the ECU 111.

More detailed explanation follows regarding the detection of faults and prior indicators of faults in the batteries by the ECU 111. As described above, the ECU 111 detects faults and prior indicators of faults in the batteries using the values detected by the temperature sensors 107e, 107p and the current sensors 105e, 105p. When the values detected by the respective sensors are within specific ranges, the ECU 111 detects that the batteries are functioning correctly. When the values detected by the respective sensors are outside the specific ranges by within specific amounts, the ECU 111 detects a prior indicator of a fault and a level thereof based on the value of the departure from the specific range. The ECU 111 detects a fault when the values detected by the respective sensors are outside the specific ranges by the specific amounts or greater. Note that the ECU 111 may also detect faults and prior indicators of faults in the batteries based on discontinuity in the SOC described above.

Moreover, the ECU 111 controls the VCU 101 in a "current control mode" when a fault has not occurred in the high-capacity battery ES-E, and controls the VCU 101 in a "voltage control mode" when a fault has occurred in the high-capacity battery ES-E. Explanation follows regarding the two control modes (the current control mode and the voltage control mode) with which the ECU 111 controls the VCU 101.

The current control mode is, in principle, employed in a state in which both the high-capacity battery ES-E and the high-power battery ES-P are functioning correctly. In the current control mode, the voltage of the high-capacity battery ES-E is applied to the motor/generator 11 by the power distribution control of the VCU 101 described above, and in cases in which the power supplied from the high-capacity battery ES-E does not meet a demand for power corresponding to the drive power demanded by the motor/generator 11, the high-power battery ES-P outputs power to make up the insufficiency amount. However, since the voltage Vp of the high-power battery ES-P is lower than the voltage Ve applied to the motor/generator 11 by the high-capacity battery ES-E, the VCU 101 steps up the voltage Vp of the high-power battery ES-P so as to equal the voltage Ve of the high-capacity battery ES-E. In this manner, in the current control mode, the voltage Vp of the high-power battery ES-P is stepped up so as to match a voltage equal to the voltage Ve of the high-capacity battery ES-E. Moreover, the current Ip output by the high-power battery ES-P differs according to the size of the power insufficiency amount demanded of the high-power battery ES-P. Accordingly, in the current control mode, the voltage Vp and the current Ip of the high-power battery ES-P are fed back to the VCU 101. Note that control is stable when performing control in the current control mode.

The voltage control mode is employed in a state in which the high-power battery ES-P is functioning correctly but a fault has occurred in the high-capacity battery ES-E. In the voltage control mode, power is supplied to the motor/generator 11 from the high-power battery ES-P only, and the VCU 101 steps up the voltage Vp of the high-power battery ES-P such that the voltage applied to the motor/generator 11 reaches an optimum voltage having a maximum drive efficiency for the drive power demanded by the motor/generator 11. Accordingly, in the voltage control mode, either feed-forward control with an instruction value of the optimum voltage of the motor/generator 11, or feed-back control with an instruction value of the difference between the voltage Vp of the high-power battery ES-P and the optimum voltage of the motor/generator 11, is employed to control the VCU 101. This thereby enables drive efficiency of the motor/generator 11 to be optimized.

Figure 3:
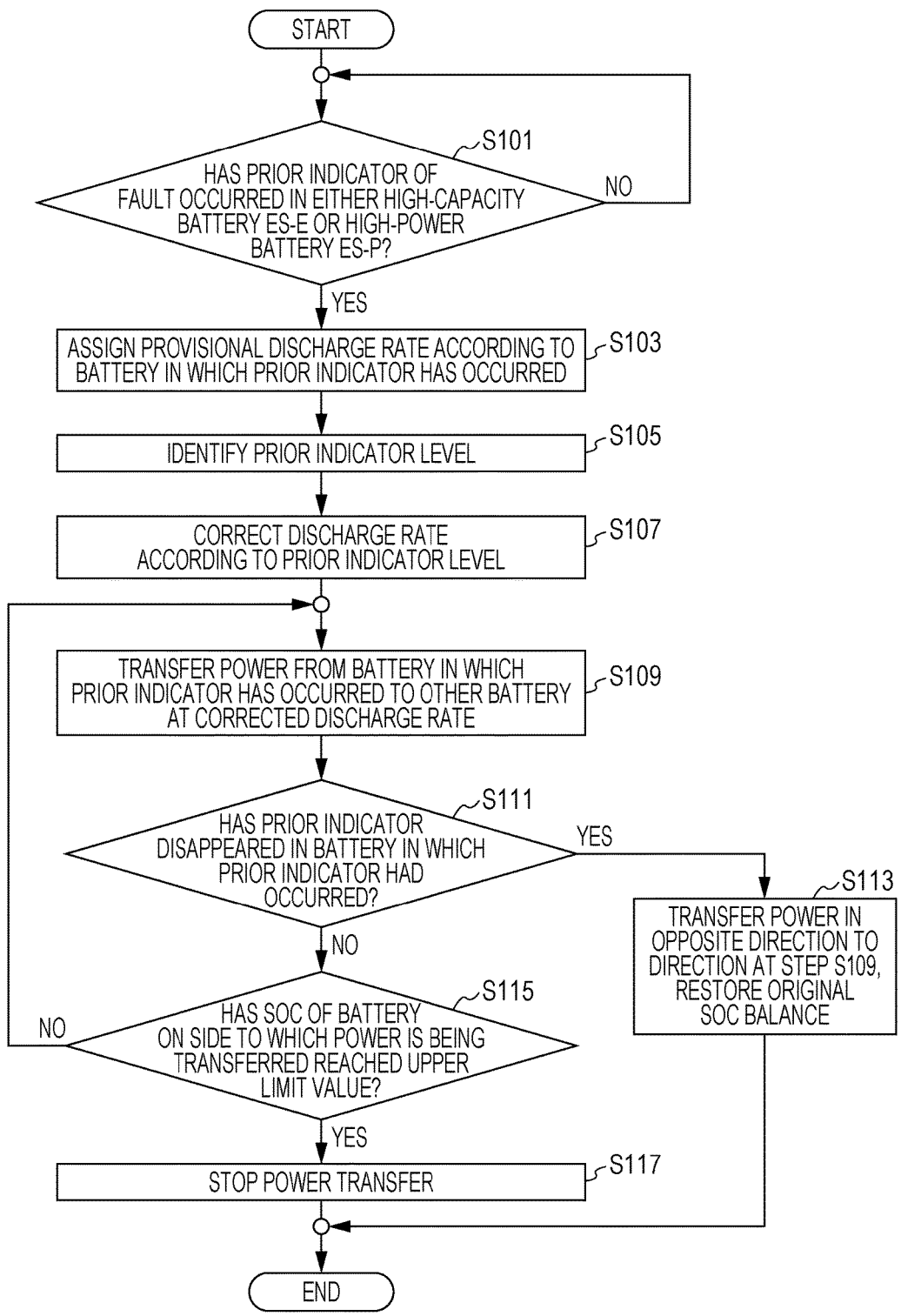
FIG. 3 is a flowchart of a method for controlling a VCU with an ECU when a prior indicator of a fault has occurred in either a high capacity battery or a high output battery.

With reference to FIG. 3, detailed explanation follows regarding a method for controlling the VCU 101 with the ECU 111 when a prior indicator of a fault occurs in either the high-capacity battery ES-E or the high-power battery ES-P. FIG. 3 is a flowchart of the method for controlling the VCU 101 with the ECU 111 when a prior indicator of a fault has occurred in either the high-capacity battery ES-E or the high-power battery ES-P.

As illustrated in FIG. 3, the ECU 111 determines whether or not a prior indicator of a fault has occurred in the high-capacity battery ES-E or the high-power battery ES-P based on the voltages detected by the voltage sensors 103e, 103p, the currents detected by the current sensors 105e, 105p, and the temperatures detected by the temperature sensors 107e, 107p (step S101). Processing proceeds to step S103 if a prior indicator is present. At step S103, the ECU 111 assigns a provisional discharge rate according to the battery in which the prior indicator has occurred.

Figure 4:
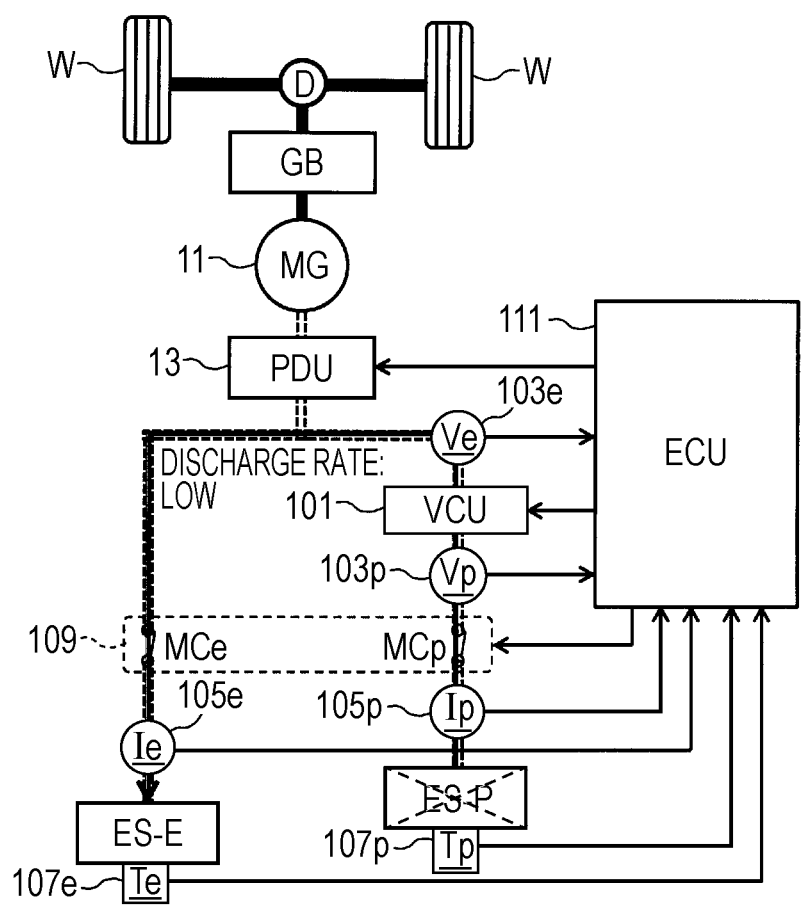
FIG. 4 is a diagram illustrating a flow of current during power transfer from a high output battery to a high capacity battery when a prior indicator of a fault has occurred in the high output battery.
Figure 5:
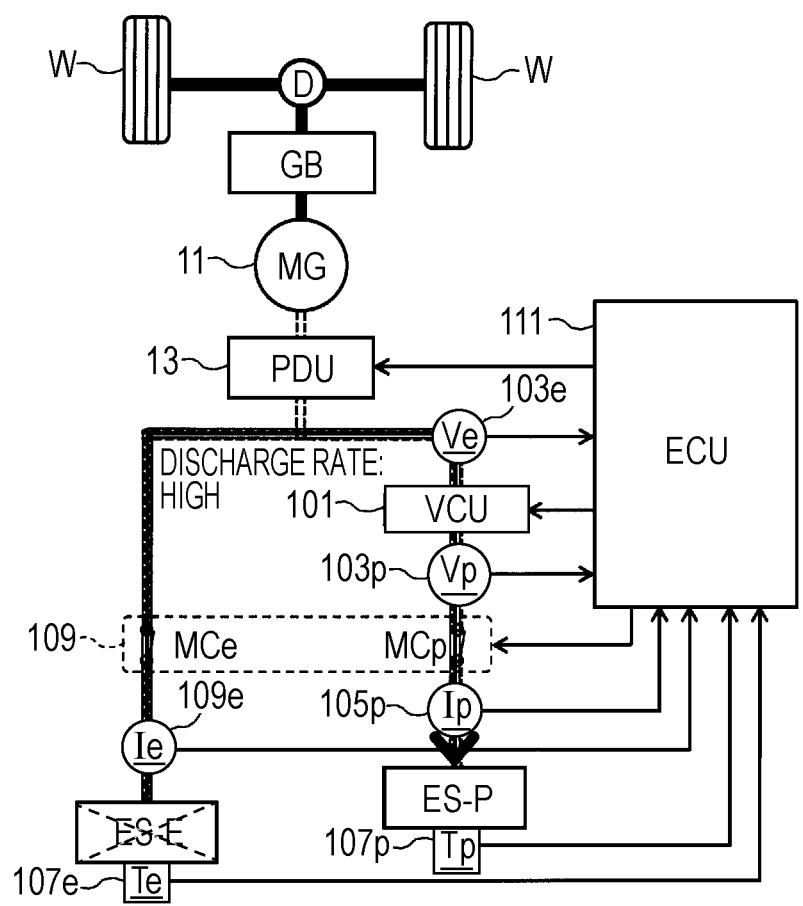
FIG. 5 is a diagram illustrating a flow of current during power transfer from a high capacity battery to a high output battery when a prior indicator of a fault has occurred in the high capacity battery.

The provisional discharge rate assigned at step S103 differs depending on whether the prior indicator has occurred in the high-capacity battery ES-E or the high-power battery ES-P. As described above, the characteristics of the high-capacity battery ES-E and the characteristics of the high-power battery ES-P are different to each other, and the C rate characteristic, this being a parameter indicating the ability to withstand deterioration of the energy storage capacity with respect to charging and discharging, and the internal resistance (impedance), this being a parameter indicating the electrical resistance to charging and discharging, are better in the high-power battery ES-P than in the high-capacity battery ES-E. Moreover, the energy storage capacity, this being a parameter indicating the total amount of chargeable and dischargeable electricity, of the high-capacity battery ES-E is superior to that of the high-power battery ES-P, and therefore the amount of power transferable is greater when the battery in which the prior indicator has occurred is the high-capacity battery ES-E. Accordingly, the ECU 111 sets the discharge rate higher in cases in which in which the battery in which the prior indicator has occurred is the high-capacity battery ES-E, as illustrated in FIG. 5, than in cases in which the battery in which the prior indicator has occurred is the high-power battery ES-P, as illustrated in FIG. 4. Setting in this manner enables power to be transferred at an appropriate discharge rate, according to the ability to withstand charging of the battery on the side to which power is being transferred, and the amount of power to be transferred.

More detailed explanation follows regarding appropriate discharge rates. In cases in which a prior indicator of a fault is detected in the high-capacity battery ES-E, since the transferable power amount is large, as described above, and the transfer target high-power battery ES-P has a good C rate characteristic with respect to charging, the ECU 111 preferably sets a high discharge rate, as illustrated in FIG. 5. Conversely, in cases in which a prior indicator of a fault is detected in the high-power battery ES-P, since the transferable power amount is small, and the transfer target high-capacity battery ES-E does not have such a good C rate characteristic with respect to charging, the ECU 111 preferably sets a low discharge rate, as illustrated in FIG. 4.

Next, the ECU 111 identifies a prior indicator level indicating a probability level of an actual fault occurring in the battery in which the prior indicator has occurred (step S105). The prior indicator level is identified based on, for example, the temperature of the battery when the ECU 111 detected the prior indicator, and is expressed as a numerical value. The ECU 111 sets a correction coefficient corresponding to the prior indicator level in order to correct the provisional discharge rate assigned at step S103 (step S107).

Figure 6:
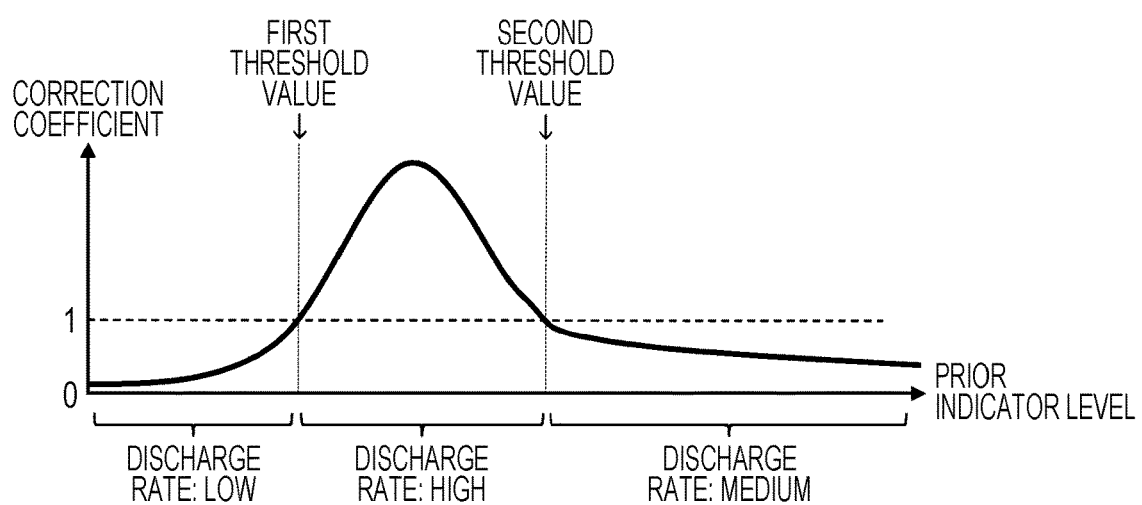
FIG. 6 is a diagram illustrating a relationship between prior indicator levels and a correction coefficient.

As illustrated in FIG. 6, if the prior indicator level is less than a first threshold value, the correction coefficient set at step S107 is set so as to give a smaller value as the prior indicator level becomes lower. When there is a low prior indicator level of less than the first threshold value, there is a low probability of the battery in which the prior indicator has occurred developing a fault. Accordingly, due to setting the correction coefficient such that the discharge rate becomes lower as the prior indicator level becomes lower, the discharge rate after correcting with the correction coefficient becomes lower. This thereby enables a reduction in energy loss as a result of power transfer in cases in which the battery in which the prior indicator has occurred does not become faulty.

If the prior indicator level is equal to or greater than a second threshold value that is higher than the first threshold value, the correction coefficient set at step S107 is set so as to give a smaller value the higher the prior indicator level. When there is a high prior indicator level equal to or greater than the second threshold value, there is a high probability of the battery in which the prior indicator has occurred developing a fault as a result of the battery discharging. Accordingly, due to setting the correction coefficient such that the discharge rate becomes lower as the prior indicator level becomes higher, the discharge rate after correcting with the correction coefficient becomes lower, thereby enabling the promotion of faults as a result of power transfer to be suppressed. However, if the discharge rate becomes too low, power transfer becomes time-consuming. Accordingly, above the second threshold value, the rate by which the correction coefficient decreases as the prior indicator level increases is more gradual than the rate by which the correction coefficient decreases as the prior indicator level decreases below the first threshold value. Namely, the discharge rate corrected by the correction coefficient at or above the second threshold value becomes a medium value that is higher than the discharge rate after correction by the correction coefficient below the first threshold value.

If the prior indicator level is the first threshold value or greater, and lower than the second threshold value, the correction coefficient set at step S107 is set so as to give a greater value than when the prior indicator level is not within this range. At a medium prior indicator level of the first threshold value or greater and lower than the second threshold value, there is a high probability of the battery in which the prior indicator has occurred developing a fault. However, there is a low probability of the battery developing a fault as a result of the battery discharging. Accordingly, setting the correction coefficient so as to give a high discharge rate of the battery in which the prior indicator has occurred enables power transfer to be completed within a short time.

Next, the ECU 111 controls the VCU 101 to perform power transfer by discharging the battery in which a prior indicator was determined to have occurred at step S101 at the discharge rate obtained at step S107, and charging the other battery (step S109). Next, the ECU 111 determines whether or not the prior indicator has disappeared from the battery in which the prior indicator occurred, based on the voltages detected by the voltage sensors 103e, 103p, the currents detected by the current sensors 105e, 105p, and the temperatures detected by the temperature sensors 107e, 107p (step S111). Processing proceeds to step S113 when the prior indicator has disappeared, and processing proceeds to step S115 when the prior indicator has not disappeared.

At step S113, the ECU 111 controls the VCU 101 such that power transfer is performed in the opposite direction to at step S109, such that the respective SOCs of the high-capacity battery ES-E and the high-power battery ES-P return to a state prior to that of step S109. At step S115, the ECU 111 determines whether or not the SOC of the battery on the side to which power is being transferred has reached an upper limit value as a result of the power transfer from the battery in which the prior indicator has occurred to the other battery. Processing proceeds to step S117 when the SOC has reached the upper limit value, and processing returns to step S109 when the SOC has not reached the upper limit value. At step S117, the ECU 111 controls the VCU 101 so as to stop power transfer from the battery in which the prior indicator has occurred to the other battery.

According to the processing of the flowchart described above, when a prior indicator of a fault in either the high-capacity battery ES-E or the high-power battery ES-P occurs while both the high-capacity battery ES-E and the high-power battery ES-P are functioning correctly and the ECU 111 is accordingly controlling the VCU 101 in the current control mode, the ECU 111 controls the VCU 101 so as to transfer power from the battery in which the prior indicator has occurred to the other battery.

Figure 7:
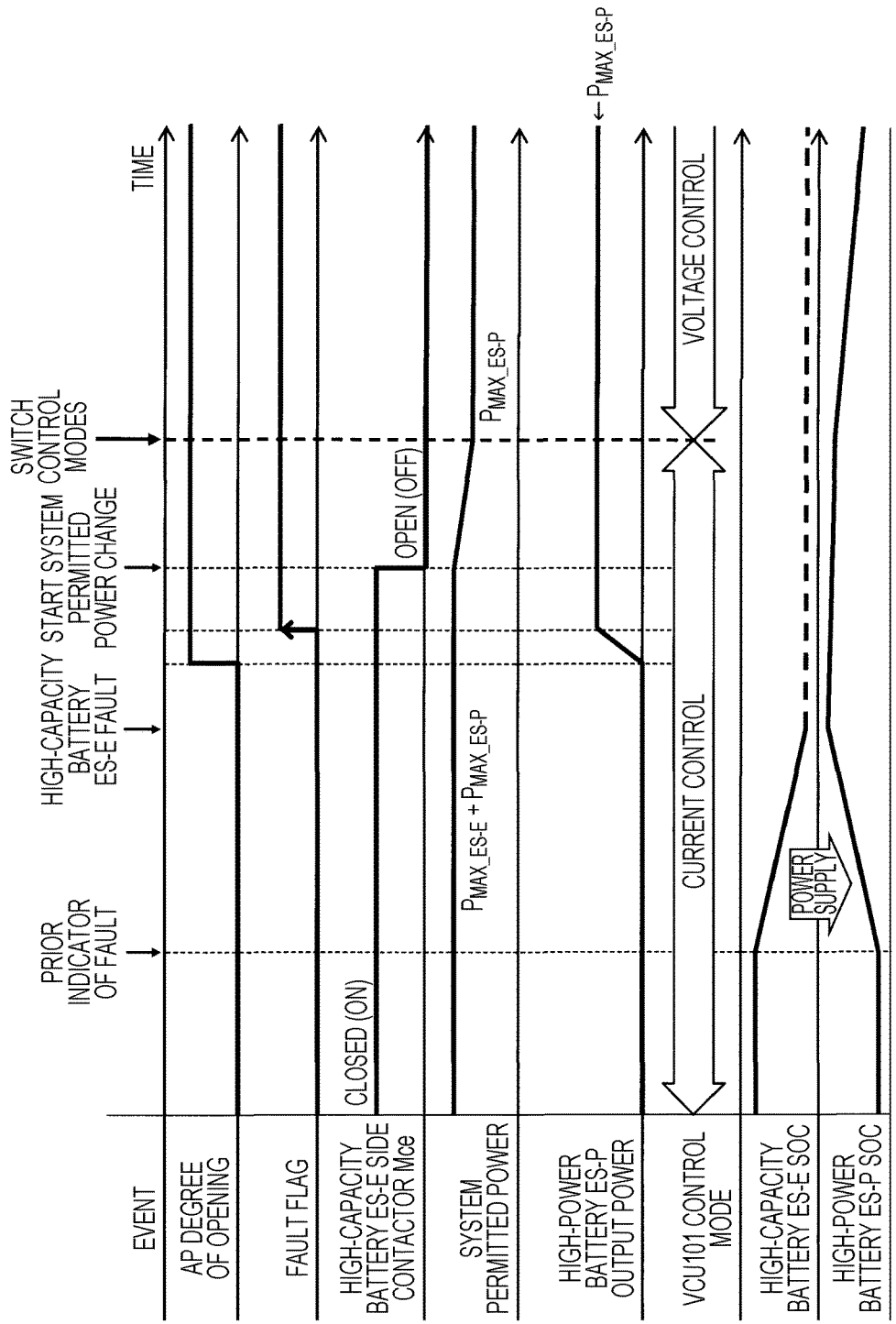
FIG. 7 is a timing chart illustrating changes in various parameters over time during ECU control when a fault occurs in a high capacity battery after a prior indicator.

FIG. 7 is a timing chart illustrating changes in various parameters over time during control by the ECU 111 when a fault occurs in the high-capacity battery ES-E after a prior indicator. As illustrated in FIG. 7, when a prior indicator of a fault occurs in the high-capacity battery ES-E and power transfer is performed from the high-capacity battery ES-E to the high-power battery ES-P, the SOC of the high-capacity battery ES-E decreases, and the SOC of the high-power battery ES-P increases.

Then, when the fault occurs in the high-capacity battery ES-E, the ECU 111 raises a fault flag indicating a fault in the high-capacity battery ES-E. The ECU 111 then opens the high-capacity battery ES-E side contactor MCe, and gradually lowers the setting value of the system permitted power to the outputtable power of the high-power battery ES-P ($P_{MAX\_ES-P}$). The ECU 111 switches the VCU 101 control mode from the current control mode to the voltage control mode after lowering the setting value of the system permitted power to the outputtable power of the high-power battery ES-P ($P_{MAX\_ES-P}$). Thereafter, the ECU 111 controls the VCU 101 in the voltage control mode.

In this manner, the control mode of the VCU 101 is not switched until the setting value of the system permitted power has been lowered to the outputtable power of the high-power battery ES-P ($P_{MAX\_ES-P}$). Accordingly, as illustrated in FIG. 7, even were an AP degree of opening to be increased by pressing down the accelerator pedal of the electrically powered vehicle prior to switching the VCU 101 control mode when the high-capacity battery ES-E was faulty, although the system permitted power is set to the total of the outputtable power of the high-capacity battery ES-E and the outputtable power of the high-power battery ES-P ($P_{MAX\_ES-E}+P_{MAX\_ES-P}$) the amount of current discharged from the correctly functioning high-power battery ES-P is controlled by the VCU 101 in the current control mode. Accordingly, the power output of the correctly functioning high-power battery ES-P is suppressed to an upper limit of the demand for power corresponding to the drive power demanded by the motor/generator 11.

Moreover, since the setting value of the system permitted power has been lowered to the outputtable power of the high-power battery ES-P ($P_{MAX\_ES-P}$) by the time of switching to the voltage control mode, the power output of the high-power battery ES-P is suppressed to an upper limit of the outputtable power of the high-power battery ES-P ($P_{MAX\_ES-P}$) even though the current amount discharged from the correctly functioning high-power battery ES-P is not controlled, and even though the VCU 101 steps up the voltage of the high-power battery ES-P to the optimum voltage of the motor/generator 11.

As described above, according to the present embodiment, at the prior indicator stage before a fault develops in either the high-capacity battery ES-E or the high-power battery ES-P, power is transferred from the battery in which the prior indicator has occurred to the other, correctly functioning, battery. This thereby enables as much usable power as possible to be secured, even if the battery in which the prior indicator has occurred goes on to develop an actual fault.

Moreover, when the prior indicator level is low, meaning the probability of a fault developing is low, power is transferred at a lower discharge rate as the prior indicator level becomes lower. This thereby enables a reduction in energy loss as a result of power transfer in cases in which the battery in which the prior indicator has occurred does not become faulty. When the prior indicator level is high, meaning the probability of a fault developing is high, there is a high probability of the battery in which the prior indicator has occurred developing a fault as a result of the battery discharging. Accordingly, power is transferred at a lower discharge rate the higher the prior indicator level, thereby enabling the promotion of faults as a result of power transfer to be suppressed. Moreover, at the medium prior indicator level, the probability of a fault developing is high. However, there is a low probability of the battery in which the prior indicator has occurred developing a fault as a result of the battery discharging. Accordingly, the battery in which the prior indicator has occurred is discharged at a discharge rate higher than the discharge rate when the prior indicator level is low and the discharge rate when the prior indicator level is high. This thereby enables power transfer to be completed within a short time. In this manner, the battery discharge rate during power transfer can be varied according to the prior indicator level, enabling power to be transferred at an appropriate discharge rate according to the probability of a fault developing following the prior indicator.

The high-power battery ES-P that has superior power weight density and inferior energy weight density compared to the high-capacity battery ES-E has a high ability to withstand charging at a high rate. However, the high-capacity battery ES-E that has inferior power weight density and superior energy weight density compared to the high-power battery ES-P has a low ability to withstand charging at a high rate. The energy storage capacity, this being a parameter indicating the total amount of chargeable and dischargeable electricity, of the high-capacity battery ES-E is superior to that of the high-power battery ES-P. Accordingly, the amount of power transferred when a prior indicator of a fault occurs in the high-capacity battery ES-E is large. In the present embodiment, the discharge rate is set higher in cases in which the battery in which the prior indicator has occurred is the high-capacity battery ES-E, as illustrated in FIG. 5, than in cases in which the battery in which the prior indicator has occurred is the high-power battery ES-P, as illustrated in FIG. 4. Setting in this manner enables power to be transferred at an appropriate discharge rate, according to the ability to withstand charging of the battery on the side to which power is being transferred, and the amount of power to be transferred. Power can accordingly be transferred at a rate suited to the differences between the characteristics of the high-capacity battery ES-E and the high-power battery ES-P. This thereby enables energy storage deterioration due to charging accompanying power transfer to be prevented.

Due to returning the transferred power to the original battery if both the high-capacity battery ES-E and the high-power battery ES-P return to correctly functioning states, the balance between the SOC of the high-capacity battery ES-E and the SOC of the high-power battery ES-P can be restored to an appropriate state according to the respective charging and discharging characteristics.

The present disclosure is not limited by the embodiments described above, and modifications, improvements, and the like may be made as appropriate. For example, the electrically powered vehicle described above is a single motor electrical vehicle (EV). However, the electrically powered vehicle may be an EV installed with plural motor/generators, may be a hybrid electrical vehicle (HEV) or a plug-in hybrid electrical vehicle (PHEV) installed with at least one motor/generator and an internal combustion engine, or may be a fuel cell vehicle (FCV).

Moreover, the voltage control mode and the current control mode with which the ECU 111 controls the VCU 101 of the present embodiment may be performed using feed-back control as described above, or may be performed using another control method, such as feed-forward control, instead of feed-back control.

Figure 8:
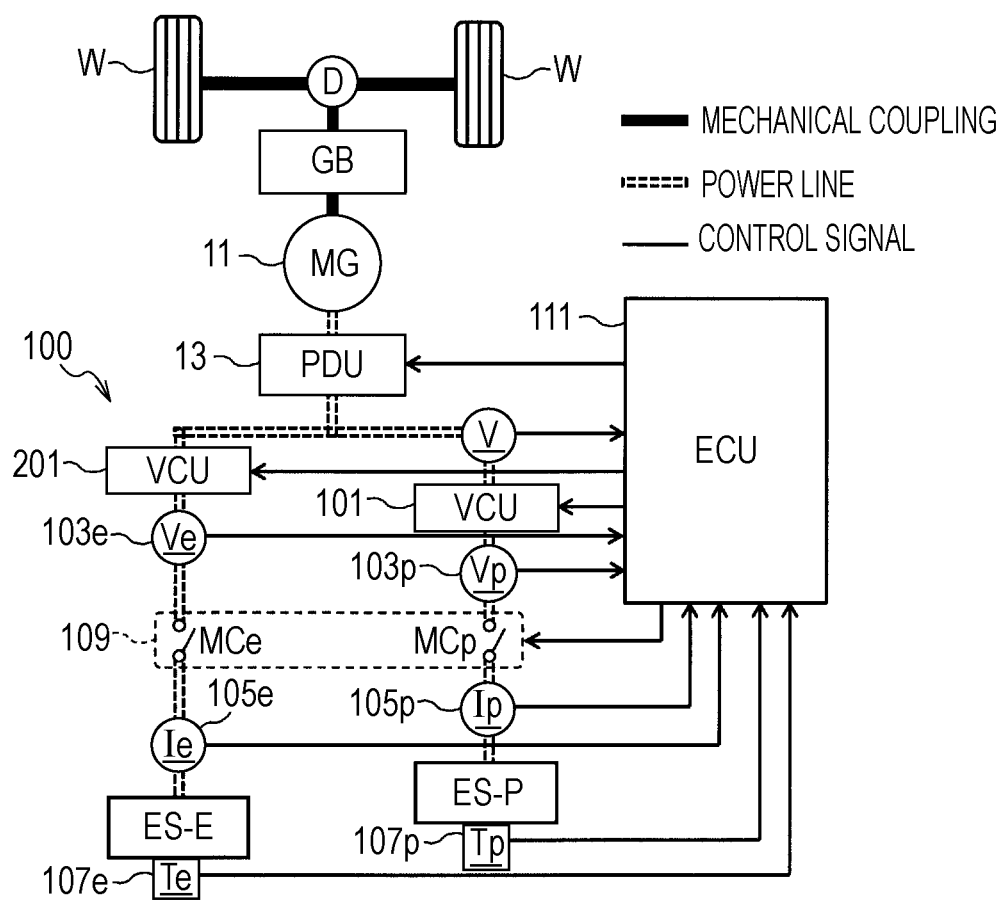
FIG. 8 is a block diagram illustrating an internal configuration of an electrically powered vehicle of another embodiment.

The VCU 101 of the present embodiment steps up the voltage Vp of the high-power battery ES-P. However, in cases in which the voltage Ve of the high-capacity battery ES-E is lower than the voltage Vp of the high-power battery ES-P, a VCU is employed to step down the voltage Vp of the high-power battery ES-P. Moreover, a VCU capable of stepping up or down in either direction may be employed. As illustrated in FIG. 8, a VCU 201 may also be provided on the high-capacity battery ES-E side. If two VCUs are provided, the voltage applied to the motor/generator 11 and the PDU 13 is not bound to that of the high-capacity battery ES-E, thereby improving efficiency.

In the above description, when the electrically powered vehicle is stationary and there is no need to drive the motor/generator 11, the ECU 111 controls the PDU 13 so as to place all of the six switching elements of the PDU 13 in the OFF state, and controls the VCU 101 so as to place both of the two switching elements of the VCU 101 in the OFF state. The high-capacity battery ES-E and the high-power battery ES-P are thereby placed in open circuit states. However, the ECU 111 may place the respective batteries in open circuit states by controlling to open the contactors Mce, MCp of the switch section 109.

According to a first aspect of the present disclosure, an energy storage system including a first energy storage (for example, a high-capacity battery ES-E of the embodiment), a second energy storage (for example, a high-power battery ES-P of the embodiment), a transformation section (for example, a VCU 101, 201 of the embodiment) that transforms at least one of an output voltage of the first energy storage and an output voltage of the second energy storage, a detection section (for example, an ECU 111 of the embodiment) that detects a prior indicator of faults in at least one of the first energy storage and the second energy storage, and a controller (for example, the ECU 111 of the embodiment) that controls the transformation section. When the detection section has detected a prior indicator of a fault in the first energy storage or the second energy storage, the controller controls the transformation section so as to transfer power from the energy storage in which the prior indicator has been detected to the other energy storage.

In a second aspect of the present disclosure, in the first aspect of the present disclosure, configuration may be made wherein the detection section identifies a prior indicator level indicating a probability level of the energy storage in which the prior indicator was detected actually becoming faulty. When the detection section has detected a prior indicator of a fault in the first energy storage or the second energy storage, the controller controls the transformation section so as to set a discharge rate of the energy storage in which the prior indicator was detected based on the prior indicator level detected by the detection section.

In a third aspect of the present disclosure, in the second aspect of the present disclosure, configuration may be made wherein the controller controls the transformation section such that, when the prior indicator level is lower than a first threshold value, the energy storage in which the prior indicator was detected discharges at a first discharge rate that becomes lower as the prior indicator level becomes lower.

In a fourth aspect of the present disclosure, in the third aspect of the present disclosure, configuration may be made wherein the controller controls the transformation section such that, when the prior indicator level is equal to or greater than a second threshold value that is larger than the first threshold value, the energy storage in which the prior indicator was detected discharges at a second discharge rate that becomes lower as the prior indicator level becomes higher.

In a fifth aspect of the present disclosure, in is the fourth aspect of the present disclosure, configuration may be made wherein the controller controls the transformation section such that, when the prior indicator level is equal to or greater than the first threshold value and lower than the second threshold value, the energy storage in which the prior indicator was detected discharges at a discharge rate higher than the first discharge rate and the second discharge rate.

In a sixth aspect of the present disclosure, in any one of the first aspect to the fifth aspect of the present disclosure, configuration may be made wherein charging and discharging characteristics of the first energy storage and charging and discharging characteristics of the second energy storage are different from each other. The controller controls the transformation section such that a discharge rate of the first energy storage when the detection section has detected a prior indicator of a fault in the first energy storage, and a discharge rate of the second energy storage when the detection section has detected a prior indicator of a fault in the second energy storage, are different from each other.

In a seventh aspect of the present disclosure, in the sixth aspect of the present disclosure, configuration may be made wherein the second energy storage has superior power weight density and inferior energy weight density to the first energy storage. The controller sets the discharge rate of the first energy storage when the detection section has detected a prior indicator of a fault in the first energy storage higher than the discharge rate of the second energy storage when the detection section has detected a prior indicator of a fault in the second energy storage.

In an eighth aspect of the present disclosure, in any one of the first aspect to the seventh aspect of the present disclosure, configuration may be made wherein the controller controls the transformation section so as to transfer power from the other energy storage to the energy storage in which the prior indicator was detected when the prior indicator of a fault in the first energy storage or the second energy storage that had been detected by the detection section has disappeared.

A ninth aspect of the present disclosure describes a transporter including the energy storage system of any one of the first aspect to the eighth aspect of the present disclosure.

A tenth aspect of the present disclosure describes a control method for an energy storage system including a first energy storage (for example, the high-capacity battery ES-E of the embodiment), a second energy storage (for example, the high-power battery ES-P of the embodiment), a transformation section (for example, the VCU 101, 201 of the embodiment) that transforms at least one of an output voltage of the first energy storage and an output voltage of the second energy storage, a detection section (for example, the ECU 111 of the embodiment) that detects a prior indicator of faults in at least one of the first energy storage and the second energy storage, and a controller (for example, the ECU 111 of the embodiment) that controls the transformation section. In this control method, when the detection section has detected a prior indicator of a fault in the first energy storage or the second energy storage, the controller controls the transformation section so as to transfer power from the energy storage in which the prior indicator has been detected to the other energy storage.

According to the first, ninth, and tenth aspects of the present disclosure, at the prior indicator stage before a fault develops in either of the two energy storages, power is transferred from the energy storage in which the prior indicator of a fault has been detected to the other, correctly functioning, energy storage. This thereby enables as much usable power as possible to be secured, even if the energy storage in which the prior indicator was detected actually becomes faulty.

According to the second aspect of the present disclosure, the energy storage discharge rate during power transfer can be varied according to the prior indicator level, enabling power to be transferred at an appropriate discharge rate according to the probability level of the prior indicator developing into a fault.

According to the third aspect of the present disclosure, when the prior indicator level is low, meaning the probability of a fault developing is low, power is transferred at a lower discharge rate as the prior indicator level becomes lower. This thereby enables a reduction in energy loss as a result of power transfer in cases in which the energy storage in which the prior indicator was detected does not become faulty.

According to the fourth aspect of the present disclosure, when the prior indicator level is high, meaning the probability of a fault developing is high, there is a high probability of the energy storage in which the prior indicator was detected developing a fault as a result of the energy storage discharging. Accordingly, power is transferred at a lower discharge rate the higher the prior indicator level, thereby enabling the promotion of faults as a result of power transfer to be suppressed.

According to the fifth aspect of the present disclosure, at a medium prior indicator level, the probability of a fault developing is high. However, there is a low probability of the energy storage in which the prior indicator was detected developing a fault as a result of the energy storage discharging. Accordingly, the energy storage in which the prior indicator was detected is discharged at a discharge rate higher than the first discharge rate when the prior indicator level is low and the second discharge rate when the prior indicator level is high. This thereby enables power transfer to be completed within a short time.

According to the sixth aspect of the present disclosure, power can be transferred at a discharge rate according to the charging and discharging characteristics of the energy storage devices.

According to the seventh aspect of the present disclosure, the second energy storage that has superior power weight density and inferior energy weight density to the first energy storage has a high ability to withstand charging at a high rate. However, the first energy storage that has inferior power weight density and superior energy weight density compared to the second energy storage has a low ability to withstand charging at a high rate. The energy storage capacity, this being a parameter indicating the total amount of chargeable and dischargeable electricity, of the first energy storage is superior to that of the second energy storage. Accordingly, the amount of power transferred when the energy storage in which a prior indicator of a fault has occurred is the first energy storage is large. Accordingly, setting the discharge rate of the energy storage in which the prior indicator of a fault has occurred to an appropriate value according to the ability to withstand charging of the energy storage on the side to which power is being transferred, and the amount of power to be transferred, enables energy storage deterioration due to charging accompanying power transfer to be prevented.

According to the eighth aspect of the present disclosure, due to returning the transferred power to the original energy storage if both the first energy storage and the second energy storage return to a correctly functioning state, the balance between the state of charge of the first energy storage and the state of charge of the second energy storage to be restored to an appropriate state according to the respective charging and discharging characteristics.

Obviously, numerous modifications and variations of the present invention are possible in light of the above teachings. It is therefore to be understood that within the scope of the appended claims, the invention may be practiced otherwise than as specifically described herein.

What is claimed is:
1. An energy storage system comprising:
   a first energy storage;
   a second energy storage;

a transformation section that transforms at least one of an output voltage of the first energy storage and an output voltage of the second energy storage;

a detection section that detects a prior indicator of faults in at least one of the first energy storage and the second energy storage; and a controller that controls the transformation section, wherein:

when the detection section has detected a prior indicator of a fault in the first energy storage or the second energy storage, the controller controls the transformation section so as to transfer power from the energy storage in which the prior indicator has been detected to the other energy storage;

the detection section identifies a prior indicator level indicating a probability level of the energy storage in which the prior indicator was detected actually becoming faulty;

when the detection section has detected a prior indicator of a fault in the first energy storage or the second energy storage, the controller controls the transformation section so as to set a discharge rate of the energy storage in which the prior indicator was detected based on the prior indicator level detected by the detection section; and the controller controls the transformation section such that, when the prior indicator level is lower than a first threshold value, the energy storage in which the prior indicator was detected discharges at a first discharge rate that becomes lower as the prior indicator level becomes lower.

2. The energy storage system of claim 1, wherein the controller controls the transformation section such that, when the prior indicator level is equal to or greater than a second threshold value that is larger than the first threshold value, the energy storage in which the prior indicator was detected discharges at a second discharge rate that becomes lower as the prior indicator level becomes higher.

3. The energy storage system of claim 2, wherein the controller controls the transformation section such that, when the prior indicator level is equal to or greater than the first threshold value and lower than the second threshold value, the energy storage in which the prior indicator was detected discharges at a discharge rate higher than the first discharge rate and the second discharge rate.

4. A transporter comprising the energy storage system of claim 1.

5. An energy storage system comprising:
a first energy storage to output a first output voltage;
a second energy storage to output a second output voltage;
a transformer to transform at least one of the first output voltage and the second output voltage; and
circuitry configured to:
detect a sign of a fault in one energy storage among the first energy storage and the second energy storage; and
control the transformer so as to transfer power stored in the one energy storage from the one energy storage to charge another energy storage among the first energy storage and the second energy storage when the sign of the fault in the one energy storage is detected.

6. The energy storage system of claim 5, wherein:
the circuitry identifies a sign level indicating a probability level of the energy storage in which the sign was detected actually becoming faulty; and, when the circuitry has detected the sign of the fault in the first energy storage or the second energy storage, the circuitry is configured to control the transformer so as to set a discharge rate of the energy storage in which the sign was detected based on the sign level detected by the circuitry.

7. The energy storage system of claim 6, wherein the circuitry is configured to control the transformer such that, when the sign level is lower than a first threshold value, the energy storage in which the sign was detected discharges at a first discharge rate that becomes lower as the sign level becomes lower.

8. The energy storage system of claim 7, wherein the circuitry is configured to control the transformer such that, when the sign is equal to or greater than a second threshold value that is larger than the first threshold value, the energy storage in which the sign was detected discharges at a second discharge rate that becomes lower as the sign level becomes higher.

9. The energy storage system of claim 8, wherein the circuitry is configured to control the transformer such that, when the sign level is equal to or greater than the first threshold value and lower than the second threshold value, the energy storage in which the sign was detected discharges at a discharge rate higher than the first discharge rate and the second discharge rate.

10. The energy storage system of claim 5, wherein:
charging and discharging characteristics of the first energy storage and charging and discharging characteristics of the second energy storage are different from each other; and
the circuitry is configured to control the transformer such that a discharge rate of the first energy storage when the circuitry has detected the sign of the fault in the first energy storage, and a discharge rate of the second energy storage when the circuitry has detected the sign of the fault in the second energy storage, are different from each other.

11. The energy storage system of claim 10, wherein:
the second energy storage has superior power weight density and inferior energy weight density to the first energy storage; and
the circuitry is configured to set the discharge rate of the first energy storage when the circuitry has detected the sign of the fault in the first energy storage higher than the discharge rate of the second energy storage when the circuitry has detected the sign of the fault in the second energy storage.

12. The energy storage system of claim 5, wherein the circuitry is configured to control the transformer so as to transfer power from the other energy storage to the energy storage in which the sign was detected when the sign of the fault in the first energy storage or the second energy storage that had been detected by the circuitry has disappeared.

13. A transporter comprising the energy storage system of claim 5.

14. The energy storage system of claim 5, further comprising:
a sensor configured to detect one of a temperature and a current of the first energy storage or the second energy storage,
wherein the sign corresponds to the one of the temperature and the current of the first energy storage or the second energy storage.

15. A control method for an energy storage system, comprising:

detecting a sign of a fault in one energy storage among a first energy storage and a second energy storage; and
controlling a transformer so as to transfer power stored in the one energy storage from the one energy storage to charge another energy storage among the first energy storage and the second energy storage when the sign of the fault in the one energy storage is detected.

16. The control method of claim 15, further comprising:
detecting one of a temperature, a current, and a voltage of the first energy storage or the second energy storage,
wherein the sign corresponds to the one of the temperature and the current of the first energy storage or the second energy storage.

\* \* \* \* \*